US012276500B2

(12) United States Patent
Michini et al.

(10) Patent No.: US 12,276,500 B2
(45) Date of Patent: Apr. 15, 2025

(54) CONTROL POINT IDENTIFICATION SYSTEM

(71) Applicant: Skydio, Inc., San Mateo, CA (US)

(72) Inventors: Bernard J. Michini, San Francisco, CA (US); Brett Michael Bethke, Millbrae, CA (US); Hui Li, San Francisco, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 18/351,287

(22) Filed: Jul. 12, 2023

(65) Prior Publication Data

US 2023/0358537 A1    Nov. 9, 2023

Related U.S. Application Data

(63) Continuation of application No. 17/478,220, filed on Sep. 17, 2021, now Pat. No. 11,725,940, which is a continuation of application No. 15/396,096, filed on Dec. 30, 2016, now Pat. No. 11,150,089.

(60) Provisional application No. 62/273,822, filed on Dec. 31, 2015.

(51) Int. Cl.
  *G01C 15/00* (2006.01)
  *G01C 11/02* (2006.01)
  *G01C 15/02* (2006.01)
  *B64U 101/30* (2023.01)

(52) U.S. Cl.
  CPC .............. *G01C 15/02* (2013.01); *G01C 11/02* (2013.01); *B64U 2101/30* (2023.01)

(58) Field of Classification Search
  CPC ....... G01C 15/02; G01C 11/02; B64C 39/024; B64U 2101/30; B64U 2201/104
  See application file for complete search history.

(56) References Cited

U.S. PATENT DOCUMENTS 6,437,708 B1 *  8/2002  Brouwer ................ G08G 1/123
                                                  340/988
8,315,794 B1    11/2012  Strelow et al.
9,052,571 B1     6/2015  Lapstun et al.
(Continued)

FOREIGN PATENT DOCUMENTS

CN       204854730 U *  12/2015  ............. G01C 11/00
CN       107615358 A     1/2018

OTHER PUBLICATIONS

Douterloigne, Koen & Gautama, Sidharta & Philips, Wilfried. (2010). On the accuracy of 3D landscapes from UAV image data. 589-592. 10.1109/IGARSS.2010.5651391. (Year: 2010).*

(Continued)

*Primary Examiner* — Russell Frejd
*Assistant Examiner* — Brittany Renee Peko

(57) ABSTRACT

Aerial images captured by a first device are received. A landmark is identified in an aerial image of the aerial images. A determination is made, based on data in a data store, that the landmark is identified as a control point. Precise location information is associated with the control point in the data store. The precise location information indicates a location of a second device at a time that a third device that is different from the second device captured a prior image that includes the landmark. Imagery are generated using photogrammetry software based on the aerial image and the precise location information.

20 Claims, 5 Drawing Sheets

(56) References Cited

U.S. PATENT DOCUMENTS

| | | |
|---|---|---|
| 9,087,451 B1 | 7/2015 | Jarrell |
| 9,415,869 B1 | 8/2016 | Chan et al. |
| 9,529,360 B1 | 12/2016 | Melamed et al. |
| 11,150,089 B2 | 10/2021 | Michini et al. |
| 2014/0316616 A1* | 10/2014 | Kugelmass ............ G05D 1/101 701/8 |
| 2015/0032295 A1 | 1/2015 | Stark et al. |
| 2015/0148988 A1 | 5/2015 | Fleck |
| 2015/0269438 A1* | 9/2015 | Samarasekera .... G06K 9/00637 |
| 2015/0321758 A1 | 11/2015 | Sarna, II |
| 2016/0004795 A1* | 1/2016 | Novak ................ G06F 17/5004 |
| 2016/0023760 A1 | 1/2016 | Goodrich |
| 2017/0109577 A1* | 4/2017 | Wang ................. G06K 9/00746 |
| 2017/0234966 A1 | 8/2017 | Naguib et al. |
| 2018/0155023 A1 | 6/2018 | Choi et al. |
| 2018/0305012 A1 | 10/2018 | Ichihara |

OTHER PUBLICATIONS

S. Minaelan, "Vision-Based Target Detection and Localization via a Team of Cooperative UAV and UGVs", 2015 (Year: 2015).

Jayatilleke, Lalindra et al., "Landmark-Based Localization For Unmanned Aerial Vehicles," 2013 IEEE International Systems Conference, 4 pages, Apr. 15-18, 2013,.

Sharma, Rajnikant, "Observability Based Control For Cooperative Localization," 2014 International Conference on Unmanned Aircraft Systems, pp. 134-139, May 27-30, 2014,.

\* cited by examiner

CONTROL POINT IDENTIFICATION SYSTEM

CROSS-REFERENCE TO RELATED APPLICATION(S)

This application is a continuation of U.S. patent application Ser. No. 17/478,220, filed Sep. 17, 2021, which is a continuation of U.S. patent application Ser. No. 15/396,096, filed Dec. 30, 2016, which claims the benefit of priority to U.S. Provisional Patent Application No. 62/273,822, filed Dec. 31, 2015, the entire disclosures of which are incorporated herein by reference.

BACKGROUND

Conventionally, ground control points (GCP) are utilized in assisting photogrammetry software in processing images captured by a camera-equipped unmanned aerial vehicle (UAV) to build a 3D model of a given imaged subject (e.g., an area of land, buildings, or other structures). Conventionally, a GCP is a point on the ground that has had its location (e.g., latitude and longitude) measured by a high precision GNSS receiver (e.g., GPS, GLONASS, Galileo, BeiDou, GAGAN). An image captured by the UAV is associated with a GCP to provide a geo-reference and to enhance accuracy.

Although a 3D model of an imaged subject can be assembled by photogrammetry software using images and without GCP information, the images may not provide (or may not adequately provide) position, scale, or orientation information. Thus, while the proportion of the 3D model may be correct even without the use of GCPs, the measurement units and orientation may be erroneous. For example, the 3D model may be inverted and may not preserve the shape of the surveyed subject. Further, geotag information provided by a GPS unit on the UAV capturing the images will typically be insufficiently accurate as many UAVs use consumer-grade GPS units with relatively low accuracy. For example, use of a consumer-grade GPS may introduce a shift of several meters in a random direction. The GCP information may be used to provide position, scale, and orientation information for use by the photogrammetry software in building a 3D model of the imaged subject. Thus, GCPs may be used to tie images to exact physical locations on the ground, and to ensure that the 3D model is oriented according to a true coordinate frame.

Conventionally, establishing and measuring coordinates of GCPs has been a tedious, expensive, and sometimes dangerous process. For example, one conventional process requires that an operator manually place or paint a target on the ground or other location, and then manually capture location information for the target using a survey-grade GPS receiver by manually placing the GPS receiving on the target and then taking a GPS reading. Because a desirable GCP may be located in an unsafe area or may be inaccessible by an operator, it may be impractical to conventionally use such GCPs.

SUMMARY

Particular embodiments of the subject matter described in this specification can be implemented so as to realize one or more of the following advantages.

Automated processes and systems are described for quickly and safely identifying a preexisting object (e.g., a manhole cover, a roof edge, a gutter edge, a chimney, a lamppost, a telephone pole, a driveway, a sidewalk corner, a fire hydrant, a vent, an air conditioning unit, a swamp cooler, a top of a light pole, etc.), selecting an identified preexisting object as a control point (e.g., a ground control point (GCP)), and/or capturing location information for the control point using a high precision, high accuracy satellite navigation receiver device (e.g., a Carrier-Phase Enhanced GNSS receiver or other Real Time Kinematic (RTK) receiver) mounted on an unmanned vehicle. Optionally, the techniques described herein obviate the need for an operator to manually place or paint a physical target on the control point (although such targets may be used).

For example, two (or more) vehicles may be used in a process of identifying one or more preexisting landmarks for potential use as a control point, selecting one or more of the identified preexisting landmarks for use as a control point, and/or capturing location information (e.g., latitude, longitude, and/or altitude information) for selected preexisting landmarks using a high precision satellite navigation receiver device. By way of illustration, a first vehicle may be an unmanned aerial or ground vehicle optionally equipped with a high contrast visual target (e.g., comprising a black and white checkerboard pattern or other pattern) viewable from the air (e.g., positioned on the back of the first vehicle or on a rigid flag mounted to and raised above the first vehicle). Optionally, the first vehicle can be equipped with a display that can display particular patterns, numbers, letters, and so on. The first vehicle may be further equipped with a high accuracy GPS receiver. The second vehicle may be a camera-equipped unmanned aerial optionally having a relatively lower accuracy GPS receiver.

The first vehicle may be manually or automatically navigated to or proximate to a preexisting landmark (e.g., a manhole cover, a roof edge, a gutter edge, a chimney, a lamppost, a telephone pole, a driveway, a sidewalk corner, a fire hydrant, a vent, an air conditioning unit, a swamp cooler, a top of a light pole, etc.), which may have been pre-selected as a control point. For instance, and as will be described, a flight plan can be generated (e.g., described in FIG. 3) that specifies preexisting landmarks to which the first vehicle is to travel. The first vehicle may capture accurate, precise GPS coordinates (e.g., latitude and longitude), and optionally altitude information, corresponding to the landmark. Meanwhile, the second vehicle may capture images of the first vehicle while the first vehicle is on or in proximity with the selected landmark. The second vehicle may timestamp the captured images and store location information of the second vehicle corresponding to the timestamp using the relatively lower accuracy GPS receiver. Optionally, the first vehicle and second vehicle can communicate (e.g., wirelessly communicate), such that the second vehicle can indicate to the first vehicle that it captured imagery that includes, or likely includes, the first vehicle. Subsequently, the first vehicle can change locations (e.g., to a different preexisting landmark, or to another location proximate to the preexisting location). The control point information recorded by the first vehicle, and the timestamped images and location information captured by the second vehicle, may be uploaded to a cloud system, correlated, and optionally used by photogrammetry software to create combined images, such as geo-rectified imagery, ortho-rectified imagery, and/or a 3D model.

The photogrammetry software may generate 3D models using images captured on subsequent aerial surveys (e.g., by the second vehicle or other aerial vehicles) of areas including the control points. For example, when a control point is captured in an image taken by a UAV camera and then identified, corresponding control point location information (e.g., the corresponding GPS coordinates) may be accessed from a database and used to provide scale, orientation, and/or positioning information for generation of the 3D map using images stitched (e.g., combined) together.

Optionally, the first vehicle does not have to be navigated to a landmark preselected as a control point. Instead, the first vehicle may simply fly over a selected area (e.g., in a figure eight pattern, a back and forth pattern, a random pattern, or otherwise), while continuously logging its location (e.g., latitude, longitude, and/or altitude) with a time stamp. The second vehicle may capture images of the selected area (or portions thereof), where at least some of the images include the first vehicle and are timestamped and associated with GPS location information from the lower accuracy GPS receiver of the second vehicle. The logged and timestamped location information from the first vehicle and the timestamped images captured by the second vehicle may be transmitted to a control point selection system. The control point selection system may analyze images captured by the second vehicle that include the first vehicle and may identify (or an operator may identify) preexisting landmarks that are present in those images. The control point selection system (or an operator) may select one or more of such preexisting landmarks to be used as control points based on one or more criteria, and may access the corresponding precise location information from the first vehicle (e.g., using the image timestamp and lower accuracy location information to locate the corresponding first vehicle time-stamped location information). Thus, the precise location of the control point is known and may be stored in a data store (e.g., a database) for later use.

When a UAV flies a later mission and captures images, where at least some of the images include the control point, the control point may be identified to the photogrammetry software, which may use the control points to obtain geo-rectified images that map the images to a real-world coordinate frame and stitch (e.g., combine) the images together accordingly.

In general, one innovative aspect of the subject matter described in this specification can be embodied in methods that include the actions of navigating a first unmanned vehicle within a first area during a first time period; capturing, by the first unmanned vehicle, location information of the first unmanned vehicle while being navigated within the first area, using a high precision, high accuracy satellite navigation receiver; storing in memory, by the first unmanned vehicle, location information of the first unmanned vehicle in association with timestamps indicating when a given item of location information of the first unmanned vehicle was determined; navigating a second unmanned vehicle within the first area during at least a portion of the first time period, the second unmanned vehicle comprising an unmanned aerial vehicle, a camera, and a satellite navigation receiver of lower precision and accuracy then the satellite navigation receiver of the first unmanned vehicle; capturing images of the first area by the camera of the second unmanned vehicle, wherein one or more of the captured images are captured when the second unmanned vehicle is flying above the first unmanned vehicle and which include the first unmanned vehicle and one or more landmarks; storing in memory, by the second unmanned vehicle, the captured images in association with corresponding location information and timestamps indicating when a given image was captured; receiving from the first unmanned vehicle, at a first system, the location information of the first unmanned vehicle in association with the timestamps indicating when a given item of location information of the first unmanned vehicle was determined; receiving from the second unmanned vehicle, at the first system, the captured images in association with corresponding location information and timestamps indicating when a given image was captured; correlating, by the first system, at least of first of the captured images that includes the first unmanned vehicle and a first landmark, with first location information of the first unmanned vehicle using a time stamp associated with the first captured image and a time stamp associated with the first location information; selecting the first landmark as a control point; and storing an identification of the first landmark in association with the first location information.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

Like reference numbers and designations in the various drawings indicate like elements.

DETAILED DESCRIPTION

Figure 1:
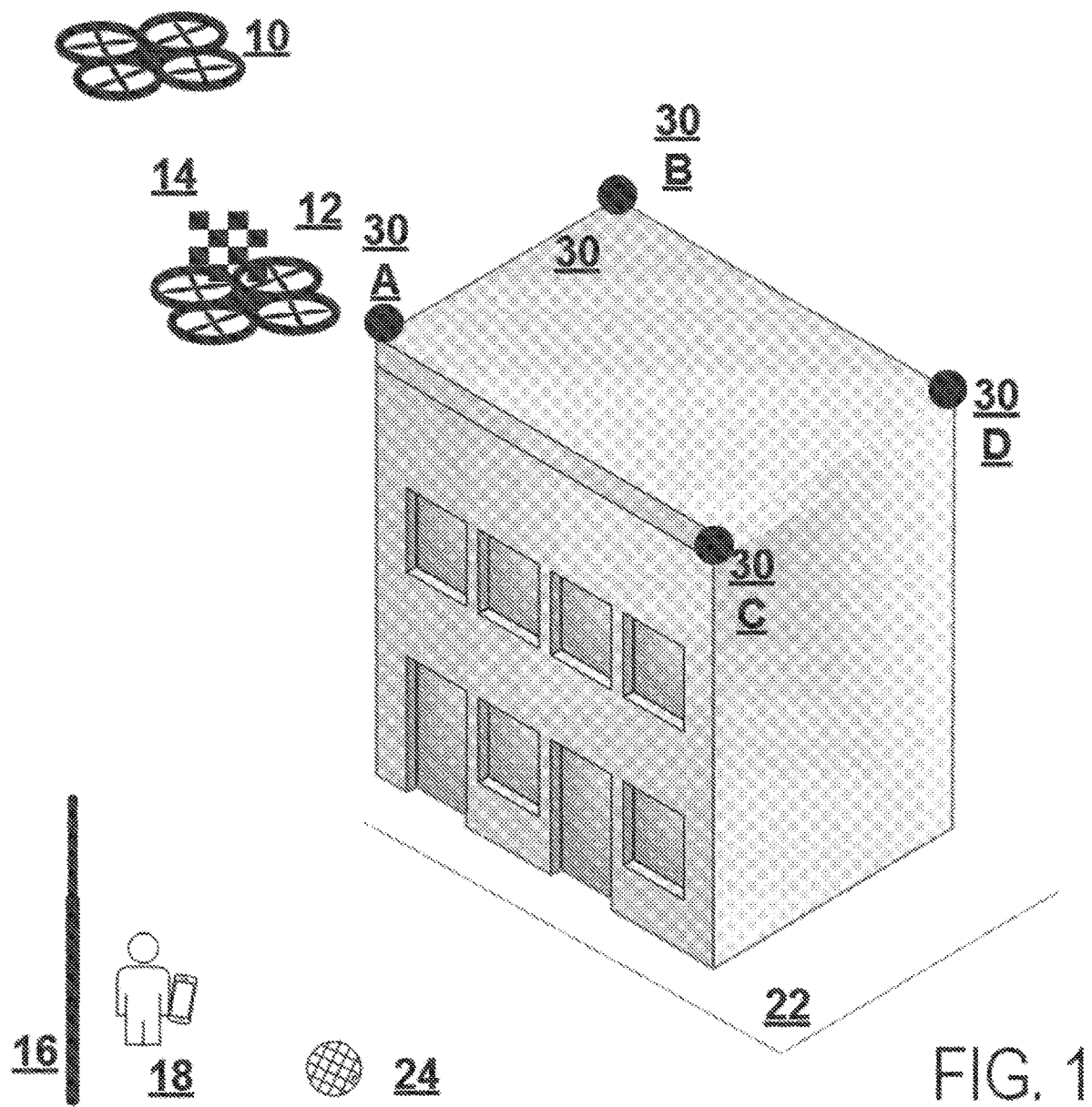
FIG. 1 illustrates an example of an Unmanned Aerial Vehicle (UAV) performing a vertical inspection of a structure.

This specification describes systems and methods for safely and accurately capturing information for control points. The control points may optionally be used (e.g., by a photogrammetry system, software, and so on) in the generation of imagery (e.g., ortho-rectified imagery, geo-rectified imagery) and/or 3D models of an area or object assembled using images captured by unmanned aerial vehicles (UAVs).

In this specification, UAVs include any unmanned aerial vehicles, such as drones, unpiloted aerial vehicles, remotely piloted aircraft, unmanned aircraft systems, any aircraft covered under Circular 328 AN/190 classified by the International Civil Aviation Organization, and so on. For example, the UAV may be in the form of a single or multi-rotor copter (e.g., a quad-copter) or a fixed wing aircraft. In addition, certain aspects of the disclosure can be utilized with other types of manned or unmanned vehicles (e.g., aerial, wheeled, tracked, and/or water vehicles). As an example, and as will be described, a UAV can travel proximate to preexisting landmarks and obtain location information (e.g., precise location information) of the UAV. This UAV can be a ground-based vehicle that can navigate around in a geo-graphic area (e.g., driving on the surface, such as a ground, street, grass, and so on).

As will be described, optionally an operator can interact with a user device that executes (e.g., runs) an application (e.g., an 'app' downloaded from an electronic application store) which enables an operator to navigate a first vehicle (e.g., a ground or unmanned aerial vehicle) equipped with a high precision satellite navigation receiver device (a Carrier-Phase Enhanced Global Positioning System (GPS) receiver or other Real Time Kinematic (RTK) receiver) to a desired control point (e.g., a ground control point (GCP) or a control point having an above-ground altitude, such as a chimney on the top of a street lamp), and to capture accurate location information (e.g., latitude, longitude, and/or altitude information) corresponding to the landmark. The user device (or another device) may navigate a second vehicle to capture images of an area that includes the control point, the images including one or more images of the control point and the first vehicle. The control point location information captured by the first vehicle and the images captured by the second vehicle may be transmitted or otherwise loaded to a remote data store and may be correlated. A photogrammetry system comprising a photogrammetry application may utilize the control point location information to generate a 3D map of the area. For example, based on the images that include the control point and on the corresponding control point location information captured by the first vehicle, the photogrammetry system can accurately scale, orient, and/or position image data in generating the 3D map.

Optionally, the first vehicle does not have to be navigated to a landmark pre-selected as a control point. Instead, the first vehicle may simply fly (or drive) over a selected area (e.g., the first vehicle can follow a flight plan that includes waypoints specifying preexisting landmarks to be traveled to, the first vehicle can follow a figure eight pattern, a back and forth pattern, a random pattern, or other flight pattern), while constantly, periodically, recording its location (e.g., latitude, longitude, and/or altitude) with a time stamp. The second vehicle may capture images of the selected area (or portions thereof), where at least some of the images include the first vehicle and are timestamped and associated with location information obtained from a GPS receiver of the second vehicle. The logged and timestamped location information from the first vehicle and the images captured by the second vehicle may be transmitted to a control point selection system (e.g., using a cellular connection, a BLUETOOTH connection, a Wi-Fi connection, a near field communication connection, and so on) and/or using a wired connection with the user device) and stored in the data store. The control point selection system may analyze images captured by the second vehicle and identify (or an operator may identify) images that include the first vehicle and may further identify (or an operator may identify) preexisting landmarks that are present in those images. The control point selection system (or an operator) may select one or more of such preexisting landmarks to be used as control points, and may access the corresponding precise location information from the first vehicle (e.g., using the image time stamp to locate the corresponding first vehicle time-stamped location information) and associate such location information with the control points. As an example, an outside system (e.g., a photogrammetry system) can utilize the images, along with location information of the first vehicle assigned as ground control points, and generate combined (e.g., stitched) images that are rectified (e.g., geo-rectified). Location information of identified landmarks can then be determined from the rectified images. Thus, the precise location of the control point is known and may be stored in a data store.

When a UAV flies a later mission and captures images, where at least some of the images include a control point, the control point may be identified to the photogrammetry software, which may use the control point (and its associated location information) to obtain geo-rectified images that map the images to a real-world coordinate frame and stitch the images together accordingly.

FIG. 1 illustrates an example of two Unmanned Aerial Vehicles (UAV) 10, 12 being used to identify and/or capture control point information. As illustrated, UAV 12 is equipped with an optional visual target 14 (e.g., a fixed visual target, or a display that can present information, such as a pattern, a signal, a logo, text, a letter, a number, and so on). UAV 12 is further equipped with a survey-grade navigation GNSS receiver device (a Carrier-Phase Enhanced GNSS device or other Real Time Kinematic (RTK) receiver. For example, a Carrier-Phase Enhanced GPS device may provide greater than a threshold of positional accuracy in a real-world coordinate frame, such as 20-30 centimeters of absolute accuracy. UAV 12 may be further equipped with a camera or other sensors.

UAV 12 may be navigated (e.g., manually by operator 18 using a control device, or automatically in accordance with a preprogrammed flight plan) in an area for which control points are desired (e.g., an area that will be subject to periodic future surveys/inspections). UAV 12 may be navigated specifically to preexisting landmarks that have already been identified (automatically or by an operator) as potential control points, or UAV 12 may be navigated in a pattern (e.g., including a sequence of back and forth movements) or randomly over the area, with one or more landmarks to be later identified and selected as control points. If flown in a pattern, the pattern may be optimized by a flight planning system to reduce the number of turns and/or the total route length. UAV 12 may be constantly or periodically logging accurate and precise location data (e.g., latitude, longitude, and/or altitude) in memory and may generate and store a timestamp in association with corresponding location data.

FIG. 1 illustrates several preexisting landmarks that may be potential control points. For example, lamppost 16, sidewalk corner 22, manhole cover 24, corners 30A, 30B, 30C, 30D of building 30 may serve as control points.

UAV 10 may be configured with a camera and optionally a relatively low accuracy, relatively low cost navigation receiver (e.g., a consumer-grade GPS receiver with about 3-4 meters of absolute accuracy), although it may be equipped with a survey-grade GPS. UAV 10 may be navigated (e.g., manually by operator 18 using a control device, or automatically in accordance with a preprogrammed flight plan) to an area through which UAV 12 is flying. UAV 10 may be flown, for at least a portion of its flight, at a higher altitude than UAV 12. UAV 10 may optionally be on a mission unrelated to the identification of control points (e.g., UAV 10 may be conducting an aerial inspection of buildings in the area). While flying, UAV 10 may capture and store photographic images of UAV 12 (including of target 14) using its camera, where some of the images may include one or more preexisting landmarks (e.g., lamppost 16, sidewalk corner 22, manhole cover 24, corner 30A, corner 30B, corner 30C, and/or corner 30D). UAV 10 may generate and store timestamps in association with the images. Optionally, UAV 10 may also store GPS location information in association with a given image, wherein the GPS location information indicates approximately the location of UAV 10 (e.g., within 3-7 meters) when the given image was captured. In addition, UAV 10 may store an identification of the type of camera that was used to capture the images, the camera lens that was used to capture the images, and may store camera angle and orientation information for each captured image.

The timestamped, precise location information from UAV 12, and the images (and corresponding timestamps and location information) from UAV 10 may be provided via a wired or wireless connection to a control point selection system. Optionally, other data, such as an identification of the camera and lens used to capture the images, and the camera angle and orientation information may be provided as well. As will be described, the control point selection system may optionally analyze images captured by UAV 10 that include UAV 12 and may identify (or an operator may identify) preexisting landmarks that are present in those images. The control point selection system (or an operator) may select one or more of such preexisting landmarks to be used as control points, and may access the corresponding precise location information received from UAV 10 (e.g., using the image time stamp to locate the corresponding time-stamped location information from UAV 12) and associate the control point with the precise location information.

As will be described, when a UAV flies a later mission in the area and captures images, where at least some of the images include the control point, the control point may be identified to the photogrammetry software, which may use the control point (and it associated location information) to obtain geo-rectified images that map the images to a real-world coordinate frame (e.g., map to the Earth's surface) and stitch the images together accordingly.

Figure 2:
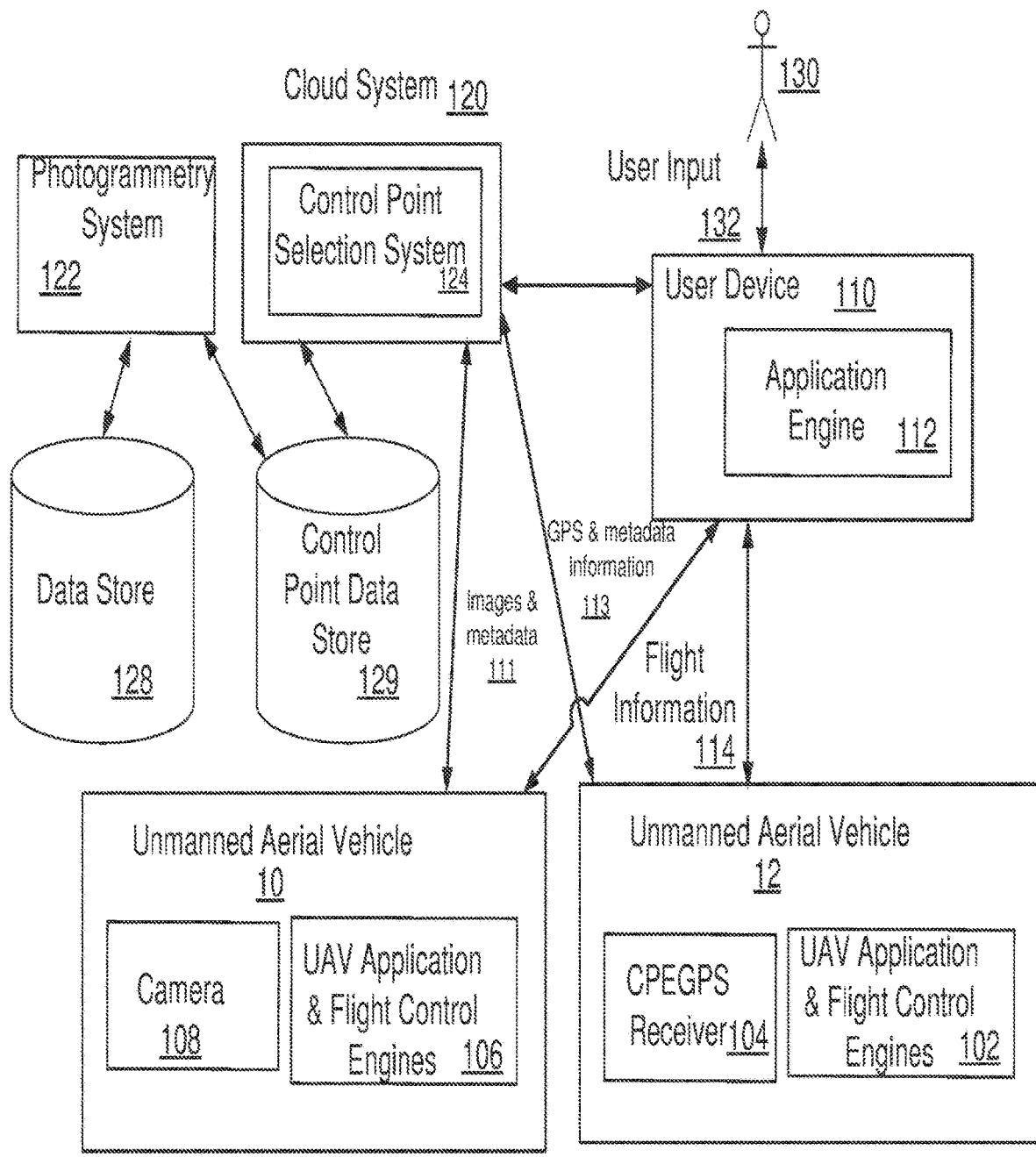
FIG. 2 is a block diagram of example systems utilized in a vertical inspection of a structure.

FIG. 2 is a block diagram of example systems that may be used in identifying, selecting, and accurately locating control points. As similarly discussed above, the control points may be used by a photogrammetry system to obtain geo-rectified images of an area and to map the images to a real-world coordinate frame and stitch the images together accordingly. In this example, the block diagram includes a user device 110 in communication with UAV 10, UAV 12, and a cloud system 120 (e.g., a system of one or more computers connected with the user device 110 over a network). As described above, the user device 110 can optionally be used to navigate UAV 10 and/or UAV 12 (e.g., by defining a flight path, a geofence, and/or by controlling the UAV(s) in real time). For example, as described above, the user device 110 may be used to navigate UAV 10 and/or UAV 12 to identify and/or capture information for one or more landmarks that may be utilized as control points.

The user device 110 in this example includes an application engine 112 that can receive user input 132 from a user 130 (e.g., an operator) specifying flight information 114 (although optionally the application engine 112 may be hosted by the cloud system 120 or other system and may be accessed by the user device 110 via a browser or otherwise). The application engine 112 can optionally be obtained from an electronic application store, which provides various applications that each enable a UAV to perform specific functionality (vertical inspections, rooftop damage inspections, and so on). The user 130 can direct his/her user device 110 to obtain (e.g., download) the application engine 112.

The application engine 112 can generate user interfaces for presentation to the user 130 that enable the user 130 to specify flight information 114 for UAV 12 and/or UAV 10. For instance, the application engine 112 can generate interactive documents (e.g., web pages) for presentation on the user device 110 (e.g., in a web browser executing on the user device), or the application engine 112 can generate user interfaces to be presented in an application window via which the user 130 can control the flight of UAV 10 and/or UAV 12.

UAV 12 includes UAV application and flight control engines 102 that can receive the flight information 114, and execute the flight plan or other instructions entered by the user 130 (or provided by the cloud system 120). Similarly, UAV 10 includes application and flight control engines 106 that can receive its respective flight information, and execute the flight plan or other instructions entered by the user 130 (or provided by the cloud system 120). UAV application and flight control engines 102 may also maintain UAV 10 within a geofence specified by the user or other entity, and generally controls the movement of UAV 12. UAV 10 may be similarly configured.

UAV 12 may also include a Carrier-Phase Enhanced GPS (CPEGPS) receiver 104. The UAV application and flight control engines 102 can direct UAV 10 to activate included sensors and can log data. For example, the UAV application and flight control engines 102 can log and timestamp GPS location data from CPEGPS receiver 104. The timestamp may be generated by the CPEGPS receiver 104 or other device. UAV 12 may also include a camera (not shown) and/or other sensors. For example, UAV 12 may optionally include visible and/or non-visible light cameras, RF sensors, chemical sensors, sound sensors, spectrometers, magnetometers, radiometers, wind sensors, ambient light sensors, barometers, temperature sensors, thermal imagers, range sensors, and/or other sensors. The logged, timestamped GPS location data from CPEGPS receiver 104 (and optionally other sensor data) may be provided to the cloud system 120 via a wired or wireless interface. UAV 12 may also be equipped with a physical target (e.g., a high contrast pattern) configured to be imaged by a camera mounted to another UAV, such as UAV 10. For example, the target may be positioned above a portion of the chassis of UAV 12, or the chassis/body of UAV 12 may be colored with a visible pattern (e.g., a black and white pattern) to act as a target.

UAV 10 may include a camera 108. The camera 108 may be mounted on a gimbal. The gimbal may be controlled by the application engine 106 to point the camera at a particular angle and in a particular direction. The camera 108 may be equipped with a zoom lens controllable by the application engine 106. The application engine 106 may instruct the camera 108 to take one or more photographic images, optionally at specified intervals, at specified times, and/or in response to specific events. The images may be stored locally on UAV 10 in association with timestamps indicating when the images were taken. The timestamps may be generated by the camera 108 or other device. Optionally, UAV 10 may be equipped with a GPS receiver (which may be significantly less accurate than CPEGPS receiver 104). Optionally, GPS location information may be stored in association with a given image, indicating the approximate location of UAV 10 when the given image was captured and optionally the approximate time the image was captured (which may be a relative time). UAV 10 may optionally include visible and/or non-visible light cameras, RF sensors, chemical sensors, sound sensors, spectrometers, magnetometers, radiometers, wind sensors, ambient light sensors, barometers, temperature sensors, thermal imagers, range sensors, and/or other sensors. The stored, timestamped images (and optionally other sensor and metadata) may be provided to the cloud system 120 via a wired or wireless interface. For example, an estimated position and attitude of the UAV 10 at the time of image capture (e.g., activation of the camera) determined using an Inertial Navigation System (INS) included in UAV 10, gimbal information (e.g., gimbal attitude at the time of capture), and so on may be provided by UAV 10 to cloud system 120.

The control point selection system 124 may be configured to analyze the images and other data received from UAV 10, identify images that include UAV 12, and in those images, identify landmarks as potential control points, and select one or more landmarks as control points. The control point selection system 124 may be configured with one or more rules and/or formulas that may be used to select landmarks from the identified images as control points. The control point selection system 124 may be configured with a machine learning algorithm to identify particular categories of landmarks (e.g., manhole cover, lamppost, sidewalk corner, fire hydrant, etc.). For example, the control point selection system 124 may be configured to classify landmarks using generative or discriminative models, and may use supervised or unsupervised learning techniques.

By way of illustration, a rule may specify a hierarchy of preferences with respect to selecting landmarks as control points. The preferences may specify landmark types (e.g., manhole covers are always preferred over lamp posts, and lamp posts are always preferred over trees), and/or the preferences may be related to landmark characteristics. For example, a visually "flat" two dimensional landmark (e.g., a manhole cover, a painted parking line, etc.) may be preferred over a three dimensional landmark (e.g., a lamppost, a telephone poll, etc.), because a two dimensional landmark is not as subject to perspective and parallax issues. By way of further example, a circular landmark (e.g., a manhole cover) may be preferred over an irregular polygon landmark (e.g., an irregularly shaped pool), as it may be easier to determine a centroid of circular landmark. By way of yet further example, a high contrast landmark (e.g., white against a black background) may be preferred over a low contrast landmark (e.g., a grey lamppost on a grey sidewalk) because it is easier to spot from the air.

By way of still further example, a stationary landmark (e.g., a sidewalk corner) may be preferred over a nonstationary landmark (e.g., a car or doormat). By way of further example, a landmark whose image was captured within a first distance range of the camera (e.g., within 30 feet) may be preferred over a landmark whose image was captured at a distance greater than the first distance range (e.g., over 60 feet). Optionally, the threshold distance may be selected based at least in part on the camera and/or lens used to capture the image of the landmark. By way of additional example, a landmark within a certain range of absolute size may be preferred over a landmark outside of that range of absolute size. By way of still additional example, a landmark within a certain range of image size (e.g., number of pixels used to form the landmark in the image) may be preferred over a landmark outside of that range of image size.

The various preferences may be weighted differently. For example, the stationary criteria may optionally be the most heavily weighted criteria (indicating it is the most important criteria), contrast criteria may optionally be the second most heavily weighted criteria, flatness criteria may optionally be the third most heavily weighted criteria, and so on. Of course the relative weighting of criteria may be different than the examples set forth herein.

Other factors that may be taken into account is distance of a landmark from another landmark selected as a control point. By way of illustration, there may be a specified minimum distance between control points. For example, if the specified minimum distance between control points is 20 meters, and two manhole covers are positioned 2 meters apart, the control point selection system 124 may select only one of the manhole covers as a control point. The control point selection system 124 may be configured to select a predetermined number of control points, or a number of control points within a given range for a certain area. For example, the control point selection system 124 may be configured to select at least 3 control points, or at least 5 control points, and no more than 15 control points for a given area up to 100 square kilometers in size. The control point selection system 124 may be configured to select a relatively greater number of control points for areas that have greater changes in topography (e.g., in elevation).

A score may be calculated for a given landmark, and the landmark may optionally need a score exceeding a first specified threshold in order to be selected as a control point. Optionally, if there are two or more landmarks with scores exceeding the first threshold within a predetermined range or area, the landmark with the highest score is selected as a control point, and optionally the other landmarks in the predetermined range or area are not used as control points.

Thus, for example, a formula for calculating a landmark score may be in the form of:

$$\text{Landmark score} = \frac{1}{2}\Sigma(w_1 f(a_1) + w_2 f(a_2) \ldots w_i f(a_i))$$

Where w is a weighting actor, f(a) is a function of a given criteria (e.g., landmark dimensionality, landmark shape, landmark contrast, landmark movement, landmark absolute size, landmark image size, etc.), and n is a normalizing factor.

For a selected control point identified in an image (or in images) that also include UAV 12, the control point selection system 124 may access the corresponding UAV 12 location information and associate the corresponding UAV 12 location information (adjusted as needed or desired) with the control point. By way of illustration, the control point selection system 124 may utilize the image timestamp and the associated relatively lower accuracy GPS location information from UAV 10 to identify matching precise and accurate GPS location information received from UAV 12. For example, the control point selection system 124 may identify matching precise GPS location information from UAV 12 by searching for and identifying timestamps that are the same or very close in time (e.g., within a threshold time period apart, such as within 1 second) and/or by finding GPS coordinates that are the same or within a threshold distance apart (e.g., within 3-4 meters).

The identification of the control points, associated images, and location information (e.g., latitude, longitude, and/or altitude) may be stored in a control point data store 129.

A photogrammetry system 122 may access images of the area captured from a later survey. The images may have been captured using a different UAV than UAV 10 or UAV 12. The photogrammetry system 122 may access the images from data store 128 and the control point information from control point data store 129, and may render a 3D model of the area (or a portion thereof), using the control point information to provide position, scale, and orientation information in building the 3D model of the area and to ensure that the 3D model is oriented according to a true coordinate frame.

Figure 3:
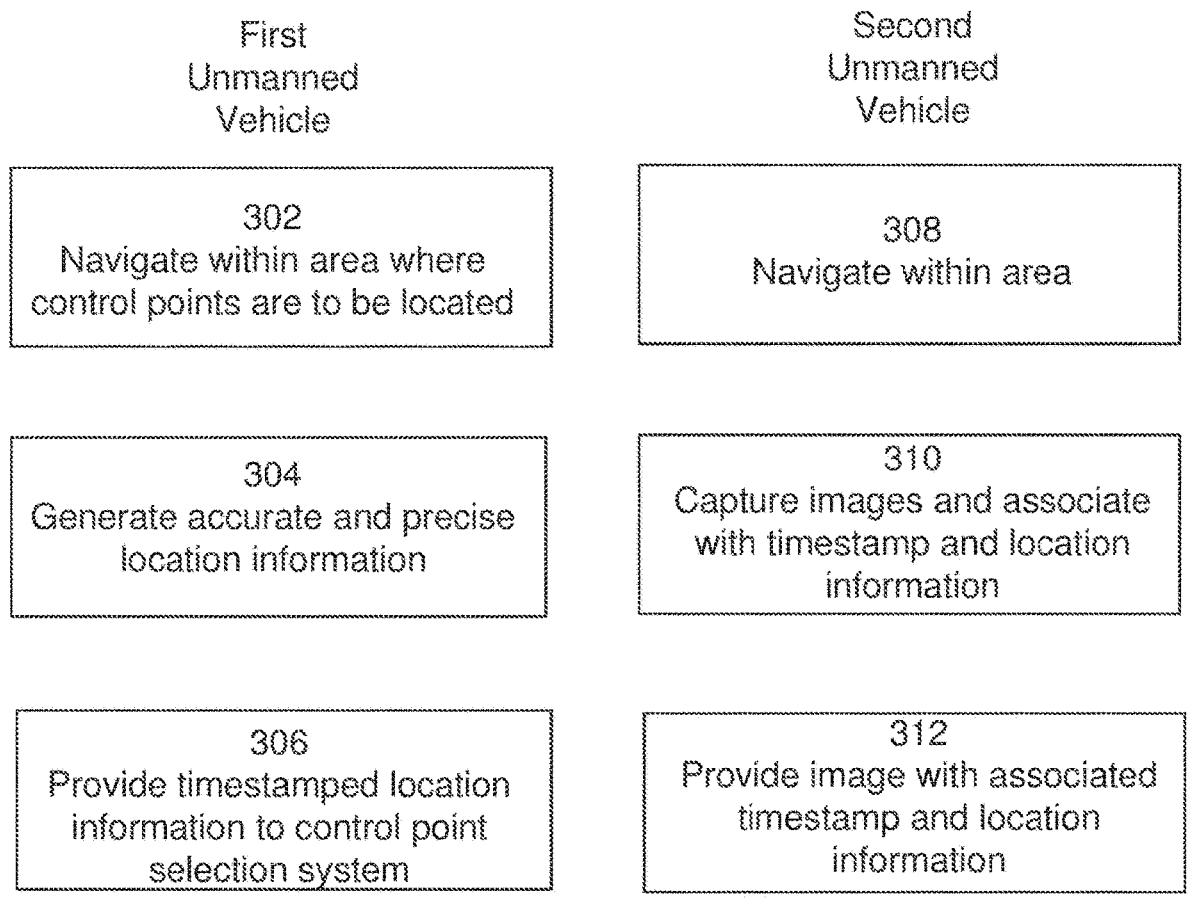
FIG. 3 is a flowchart of an example process collecting data to be used to in identifying and/or selecting control points.

FIG. 3 is a flowchart of an example process for navigating vehicles (e.g., UAV 10 and UAV 12) in order to capture control point-related data. At block 302, a first unmanned vehicle (which may be a UAV or an unmanned ground vehicle) is navigated within an area where control points are to be located. As discussed above, the first unmanned vehicle may be programmed to fly (or drive) a specified path within the area (e.g., via a user device or cloud-based system) or the first unmanned vehicle may be manually piloted via a user device within the area. At block 304 (which may be concurrent in time with block 302), the first unmanned vehicle utilizes a high precision satellite navigation receiver (e.g., a CPEGPS receiver) to generate accurate and precise location information (e.g., latitude, longitude, and/or altitude) corresponding to the first unmanned vehicle's then current location. The first unmanned vehicle may store in memory such accurate and precise location information with a timestamp (optionally generated by the high precision satellite navigation receiver) corresponding to when the location information was obtained. At block 306, the unmanned vehicle may transmit or otherwise provide such timestamped location information to a control point selection system.

At block 308, which may be concurrent or overlapping in time with blocks 302-304, a second unmanned vehicle (e.g., a UAV) is navigated in the area where the first unmanned vehicle is being navigated. The second unmanned vehicle may be on a mission separate from the collection of control point information. For example, the second unmanned vehicle may be on an inspection mission (e.g., to inspect house or other structures for hail damage). Optionally, the flight plan of the second unmanned vehicle may not be specifically configured with the intent to capture images of the first unmanned vehicle. Optionally instead, the flight plan of the second unmanned vehicle may be configured with the intent to capture images of the first unmanned vehicle.

At block 310 (which may be concurrent or overlapping in time with block 308), the second unmanned vehicle captures images of the area with a camera and records the images with associated timestamps and location information (indicating the time the images were captured and the location of the second unmanned vehicle when the images were captured). The timestamps and/or location information may have been generated by the camera when the respective images were captured, or the timestamps and/or location information may have been generated by other devices. The location information may optionally be significantly less accurate and/or less precise than that provided by the high precision satellite navigation receiver of the first unmanned vehicle. For example, the location information may be generated by a commercial-grade GPS receiver. At block 312, the second unmanned aerial vehicle may transmit or otherwise provide such image, timestamp, and location information to the control point selection system.

Figure 4:
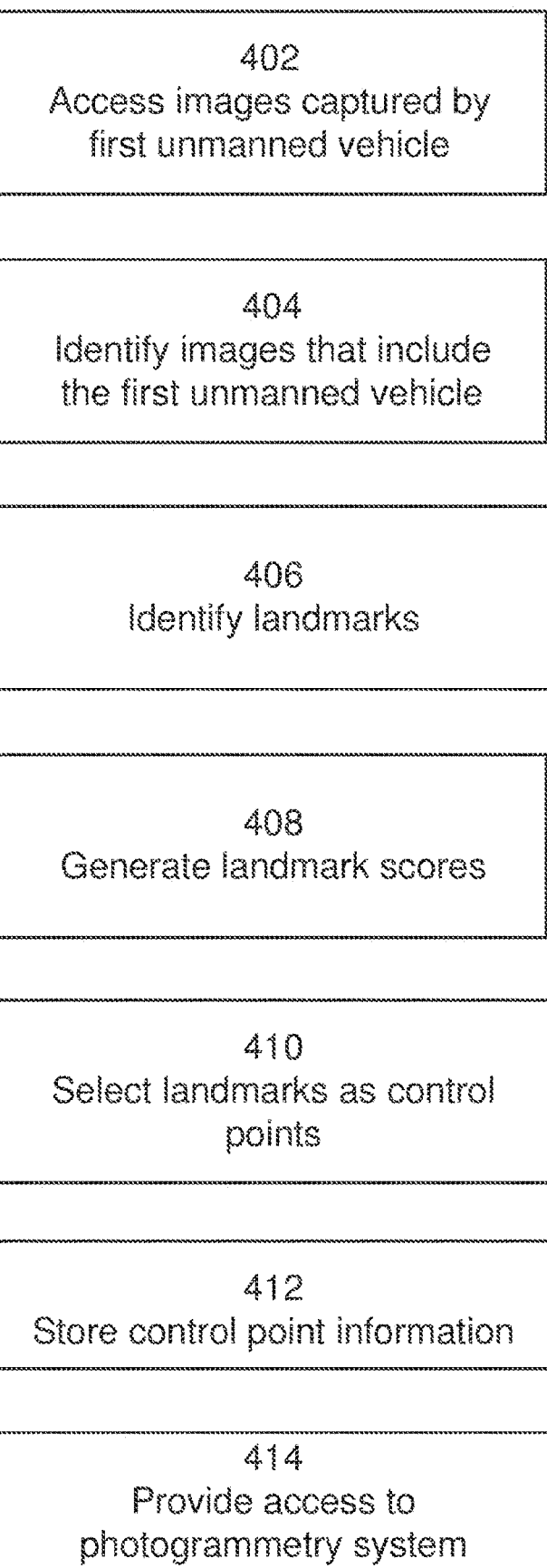
FIG. 4 is a flowchart of an example process of selecting control points.

FIG. 4 is a flowchart of an example process for selecting a preexisting landmark captured in an image as a control point. In this example, the process may be executed by a control point selection system comprising one or more processing devices and memory. At block 402, the control point selection system accesses images (and associated timestamps and location information) captured by the second unmanned aerial vehicle. At block 404, the control point selection system may identify images that include the first unmanned vehicle. For example, the first unmanned vehicle may include a highly contrasting pattern (e.g., a black and white checkerboard pattern) that may be easily identified by the control point selection system using a feature recognition engine (although such identification may be manually performed by an operator). At block 406, the control point selection system (or an operator) may identify landmarks within the images identified at block 404. At block 408, the control point selection system may generate scores for the identified landmarks (e.g., using the example formula discussed above or otherwise). At block 410, the control point selection system utilizes the scores to select control points from the identified landmarks. Optionally, in addition to or instead of calculating scores, the process may select control points based on specified landmark type preferences.

At block 412, the identification of the control points, and corresponding accurate location data is stored in a data store. At block 414, access to the data store is provided to a photogrammetry system. The photogrammetry system may utilize the control point data to accurately scale, orient, and/or position image data in generating a 3D map using images from another UAV mission.

Optionally, a system (e.g., the control point selection system, optionally in combination with the photogrammetry system) can determine location information of each identified (e.g., identified in images), selected (selected by a user, by a system such as the control point selection), landmark based on location information from the lower UAV (e.g., UAV 12) and/or the higher UAV (e.g., UAV 10).

As an example, UAV 12 can navigate about a geographic region recording location information, time stamp information, and so on. UAV 10 can capture images that include UAV 12, for instance optionally at a substantially similar altitude, and these images can be provided to an outside system (e.g., the photogrammetry system) which can generate resulting images, such as rectified images (e.g., geo-rectified images, such as images in which points within the images have been assigned location information, such as GNSS coordinates). For example, the outside system can combine the images together via a feature matching process (e.g., the system can stitch together images), and based on location information of UAV 12 (e.g., UAV 12 can be considered a ground control point), the outside system can generate rectified images (e.g., a combined image in which points have been assigned location information). The system can receive the rectified images, and identify location information of the landmarks (e.g., identify corresponding GNSS coordinates). Additionally, UAV 10 can remain hovering at a particular location while capturing images that include UAV 12 navigating. Given that a same, or similar, field of view of images captured by UAV 10 will include different locations of UAV 12 (e.g., as the UAV 10 hovers), the system, or outside system, can determine a scale associated with the images (e.g., optionally in combination with location information of UAV 10, such as GNSS coordinates; information associated with UAV's 10 camera, such as focal length, resolution, and so on). That is, a first image captured while hovering can include UAV 12 at a first location in the first image, and a second image captured while hovering can include UAV 12 at a second location. The images can be analyzed, processed, and so on, such that a same field of view in each image can be determined, and the first location and second location of UAV 12 can be utilized, optionally in combination with altitude, position, camera, information of UAV 10, to determine the scale. The images captured while the UAV 10 hovers can then be rectified (geo-rectified) based on the determined scale, optionally in combination with location information of the UAV 10, UAV 12, and location information of the landmarks can be determined.

As another example, the system can analyze one or more images, for instance images that include UAV 12 within a threshold distance of a landmark, and can determine location information of the landmark based on the location information of UAV 12 optionally in combination with location information of UAV 10 when each of the images was captured. For instance, if UAV 12 is proximate to the landmark in an image, the system can obtain location information of UAV 12 and determine location information of the landmark based on one or more of, a known size (e.g., shape, dimensions, and so on) of UAV 12, in combination with location information (e.g., a height, latitude, longitude) of UAV 10) and optionally camera information of UAV 10 (e.g., focal length). That is, the system can determine how far UAV 12 is from the landmark based on a height of UAV 10, camera information, size information of UAV 12, and so on. Additionally, as described above the UAV 12 may hover over (e.g., directly over, such as through use of a downward facing camera to ensure the UAV 12 is over a centroid) a landmark, and the system can determine that the UAV 12 is hovering over a landmark, and determine location information of the landmark as being the UAV 12's location information (e.g., latitude, longitude). Optionally, as described below, a projection of the UAV 12 onto a surface (e.g., ground) may be determined by the system, for instance if the image captured by UAV 10 is not directly above UAV 12.

In all situations in which location information of landmarks are determined, the system can optionally determine projections of UAV 12 onto a surface (e.g., the ground). For instance, since GCPs may, in some examples, be generally assumed to be fixed on the surface (e.g., the ground) of a real-world coordinate frame, if UAV 12 is not substantially close to the surface in each image, a system can improperly generate ortho-rectified or geo-rectified imagery. Therefore, a projection from UAV 12's location in 3-D space (e.g., as included in one or more images captured by UAV 10) can be made to a location vertically down on the surface (e.g., the ground). That is, a location on the surface can be determined that is vertically below UAV 12's position in each captured image by the UAV 10.

To effect this projection, the UAV 12 can additionally monitor, and record, altitude information at each timestamp associated with recording location information. The UAV 12 can utilize a distance sensor (e.g., a Lidar sensor, a Leddar sensor, barometric sensor) to accurately determine its distance from the surface. The system can utilize the distance, along with perspective information included in each image (e.g., determined from a field of view of a camera of the UAV 10), to determine the projection. In this way, the outside system can fix the first UAV to the surface, and properly generate geo-rectified or ortho-rectified imagery.

Figure 5:
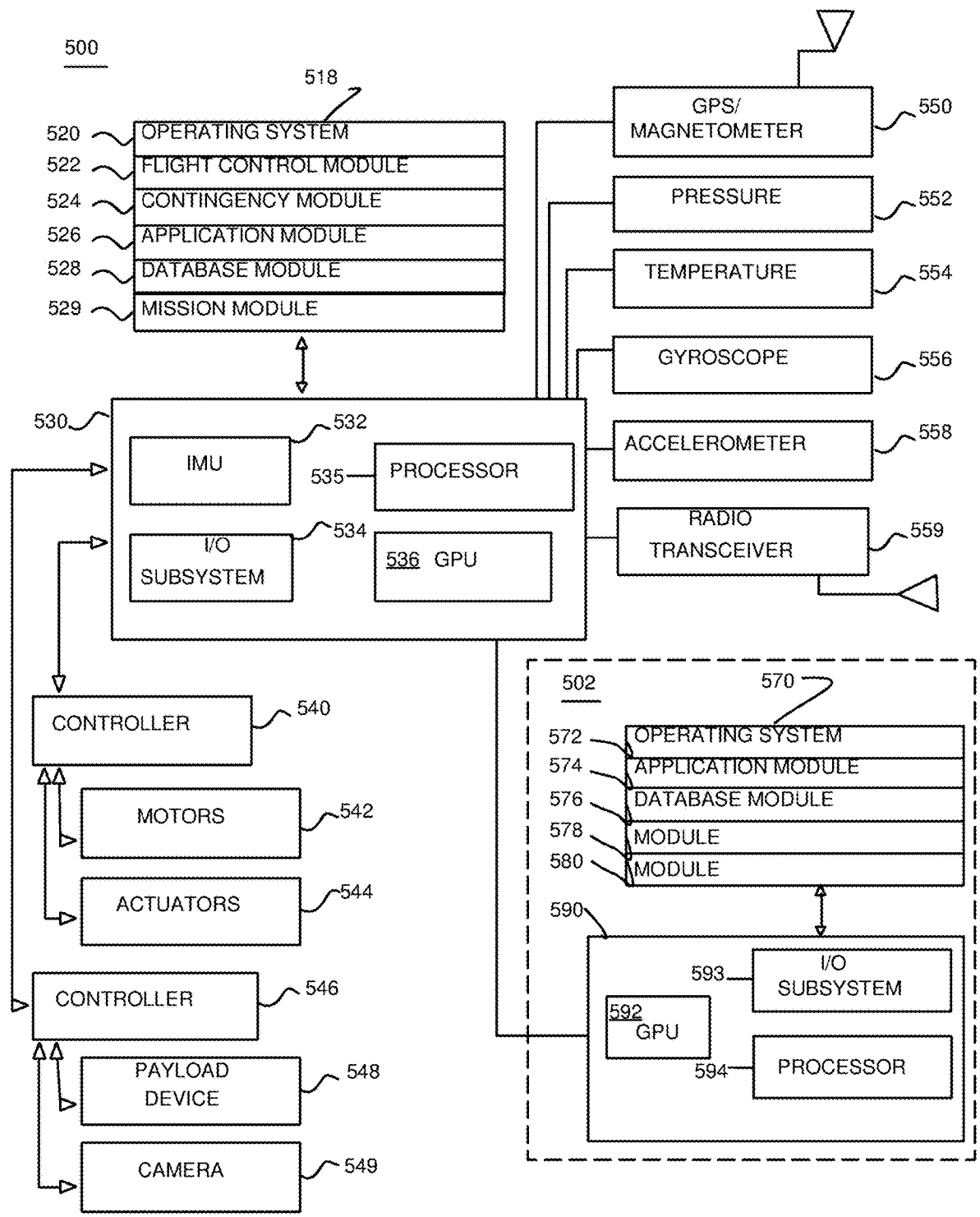
FIG. 5 illustrates a block diagram of an example Unmanned Aerial Vehicle (UAV) architecture for implementing the features and processes described herein.

FIG. 5 illustrates a block diagram of an example Unmanned Aerial Vehicle (UAV) architecture for implementing the features and processes described herein (e.g., unmanned vehicles). A UAV primary processing system 500 can be a system of one or more computers, or software executing on a system of one or more computers, which is in communication with, or maintains, one or more databases. The UAV primary processing system 500 can be a system of one or more processors 535, graphics processors 536, I/O subsystem 534, logic circuits, analog circuits, associated volatile and/or non-volatile memory, associated input/output data ports, power ports, etc., and/or one or more software processing executing one or more processors or computers. Memory 518 may include non-volatile memory, such as one or more magnetic disk storage devices, solid state hard drives, or flash memory. Other volatile memory such a RAM, DRAM, SRAM may be used for temporary storage of data while the UAV is operational. Databases may store information describing UAV flight operations, flight plans, contingency events, geofence information, component information, and other information.

The UAV processing system may be coupled to one or more sensors, such as GPS receivers 550, gyroscopes 556, accelerometers 558, pressure sensors (static or differential) 552, current sensors, voltage sensors, magnetometer, hydrometer, and motor sensors. The UAV may use an inertial measurement unit (IMU) 532 for use in navigation of the UAV. Sensors can be coupled to the processing system, or to controller boards coupled to the UAV processing system. One or more communication buses, such as a CAN bus, or signal lines, may couple the various sensor and components.

Various sensors, devices, firmware and other systems may be interconnected to support multiple functions and operations of the UAV. For example, the UAV primary processing system 500 may use various sensors to determine the vehicle's current geo-spatial location, attitude, altitude, velocity, direction, pitch, roll, yaw and/or airspeed and to pilot the vehicle along a specified route and/or to a specified location and/or to control the vehicle's attitude, velocity, altitude, and/or airspeed (optionally even when not navigating the vehicle along a specific path or to a specific location).

The flight control module 522 handles flight control operations of the UAV. The module interacts with one or more controllers 540 that control operation of motors 542 and/or actuators 544. For example, the motors may be used for rotation of propellers, and the actuators may be used for flight surface control such as ailerons, rudders, flaps, landing gear, and parachute deployment.

The contingency module 524 monitors and handles contingency events. For example, the contingency module may detect that the UAV has crossed a border of a geofence, and then instruct the flight control module to return to a predetermined landing location. Other contingency criteria may be the detection of a low battery or fuel state, or malfunctioning of an onboard sensor, motor, or a deviation from the flight plan. The foregoing is not meant to be limiting, as other contingency events may be detected. In some instances, if equipped on the UAV, a parachute may be deployed if the motors or actuators fail.

The mission module 529 processes the flight plan, waypoints, and other associated information with the flight plan as provided to the UAV in the flight package. The mission module 529 works in conjunction with the flight control module. For example, the mission module may send information concerning the flight plan to the flight control module, for example lat/long waypoints, altitude, flight velocity, so that the flight control module can autopilot the UAV.

The UAV may have various devices connected to it for data collection. For example, photographic camera 549, video cameras, infra-red camera, multispectral camera, and Lidar, radio transceiver, sonar, TCAS (traffic collision avoidance system). Data collected by the devices may be stored on the device collecting the data, or the data may be stored on non-volatile memory 518 of the UAV processing system 500.

The UAV processing system 500 may be coupled to various radios, and transmitters 559 for manual control of the UAV, and for wireless or wired data transmission to and from the UAV primary processing system 500, and optionally the UAV secondary processing system 502. The UAV may use one or more communications subsystems, such as a wireless communication or wired subsystem, to facilitate communication to and from the UAV. Wireless communication subsystems may include radio transceivers, and infrared, optical ultrasonic, electromagnetic devices. Wired communication systems may include ports such as Ethernet, USB ports, serial ports, or other types of port to establish a wired connection to the UAV with other devices, such as a ground control system, flight planning system, or other devices, for example a mobile phone, tablet, personal computer, display monitor, other network-enabled devices. The UAV may use a light-weight tethered wire to a ground control station for communication with the UAV. The tethered wire may be removeably affixed to the UAV, for example via a magnetic coupler.

Flight data logs may be generated by reading various information from the UAV sensors and operating system and storing the information in non-volatile memory. The data logs may include a combination of various data, such as time, altitude, heading, ambient temperature, processor temperatures, pressure, battery level, fuel level, absolute or relative position, GPS coordinates, pitch, roll, yaw, ground speed, humidity level, velocity, acceleration, contingency information. This foregoing is not meant to be limiting, and other data may be captured and stored in the flight data logs. The flight data logs may be stored on a removable media and the media installed onto the ground control system. Alternatively, the data logs may be wirelessly transmitted to the ground control system or to the flight planning system.

Modules, programs or instructions for performing flight operations, contingency maneuvers, and other functions may be performed with the operating system. In some implementations, the operating system 120 can be a real time operating system (RTOS), UNIX, LINUX, OS X, WINDOWS, ANDROID or other operating system.

Additionally, other software modules and applications may run on the operating system, such as a flight control module 522, contingency module 524, application module 526, and database module 528. Typically flight critical functions will be performed using the UAV processing system 500. Operating system 520 may include instructions for handling basic system services and for performing hardware dependent tasks.

In addition to the UAV primary processing system 500, a secondary processing system 502 may be used to run another operating system to perform other functions. A UAV secondary processing system 502 can be a system of one or more computers, or software executing on a system of one or more computers, which is in communication with, or maintains, one or more databases. The UAV secondary processing system 502 can be a system of one or more processors 594, graphics processors 592, I/O subsystem 594 logic circuits, analog circuits, associated volatile and/or non-volatile memory, associated input/output data ports, power ports, etc., and/or one or more software processing executing one or more processors or computers. Memory 570 may include non-volatile memory, such as one or more magnetic disk storage devices, solid state hard drives, flash memory. Other volatile memory such a RAM, DRAM, SRAM may be used for storage of data while the UAV is operational.

Ideally modules, applications and other functions running on the secondary processing system 502 will be non-critical functions in nature, that is if the function fails, the UAV will still be able to safely operate. In some implementations, the operating system 572 can be based on real time operating system (RTOS), UNIX, LINUX, OS X, WINDOWS, ANDROID or other operating system. Additionally, other software modules and applications may run on the operating system 572, such as an application module 574, database module 576. Operating system 502 may include instructions for handling basic system services and for performing hardware dependent tasks.

Also, controllers 546 may be used to interact and operate a payload device 548, and other devices such as photographic camera 549, video camera, infra-red camera, multispectral camera, stereo camera pair, Lidar, radio transceiver, sonar, laser ranger, altimeter, TCAS (traffic collision avoidance system), ADS-B (Automatic dependent surveillance-broadcast) transponder. Optionally, the secondary processing system 502 may have coupled controllers to control payload devices.

Each of the processes, methods, and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module," as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic Data Sources can include databases, volatile/non-volatile memory, and any memory system or subsystem that maintains information.

The various features and processes described above may be used independently of one another, or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
  receiving vehicle data including precise locations of a vehicle and corresponding location timestamps indicative of times that the vehicle was at the precise locations;
  receiving image data including multiple images of the vehicle, corresponding locations of a capture device when the capture device captured each of the multiple images, and corresponding capture timestamps that indicates a time that each of the multiple images was captured;
  identifying a landmark in one of the multiple images;
  identifying the landmark as a control point;
  correlating the vehicle data with the image data to identify precise location information;
  associating, in a data store, the control point with at least a portion of the precise location information;
  receiving aerial images captured by a first device;
  identifying the landmark in an aerial image of the aerial images; and
  determining, based on data in the data store, that the landmark is identified as the control point.

2. The method of claim 1, wherein determining, based on the data in the data store, that the landmark is identified as the control point comprises:
  determining that the landmark is identified as the control point based on a match between the precise location information and location information of the first device at a time that the first device captured the aerial image.

3. The method of claim 2, wherein the precise location information and the location information of the first device are determined to match responsive to a determination that the precise location information and the location information are within a threshold distance.

4. The method of claim 2, wherein the precise location information and the location information of the first device are determined to match responsive to a determination that a timestamp associated with the precise location information in the data store is within a threshold time period that the first device captured the aerial image.

5. The method of claim 1, further comprising:
generating imagery using photogrammetry software based on the aerial image and the precise location information,
wherein generating the imagery comprises:
mapping the aerial image to a real-world coordinate frame to obtain a mapped image; and
stitching the mapped image with at least one other mapped image associated with the aerial images.

6. The method of claim 1, wherein the landmark is identified in the one of the images using a machine learning algorithm trained to identify particular categories of landmarks.

7. The method of claim 1, wherein the landmark is identified as the control point based on a hierarchy of preferences with respect to selecting landmarks as control points.

8. The method of claim 7, wherein the hierarchy of the preferences includes a rule preferring two-dimensional landmarks over three-dimensional landmarks.

9. The method of claim 7, wherein the hierarchy of the preferences includes a rule preferring circular landmarks over irregularly shaped landmarks.

10. The method of claim 7, wherein the hierarchy of the preferences includes a rule preferring high contrast landmarks over low contrast landmarks.

11. The method of claim 1, wherein the one of the landmark is identified as the control point based on a score calculated using at least two criteria selected from a dimensionality of the landmark, a shape of the landmark, a contrast of the landmark, whether the landmark moves, and landmark image size.

12. A system, comprising:
a memory; and
a processor, the processor configured to execute instructions stored in the memory to:
receive vehicle data including precise locations of a vehicle and corresponding location timestamps indicative of times that the vehicle was at the precise locations;
receive image data including multiple images of the vehicle, corresponding locations of a capture device when the capture device captured each of the multiple images, and corresponding capture timestamps that indicates a time that each of the multiple images was captured;
identify a landmark in one of multiple received images;
identify the landmark as a control point;
correlate the vehicle data with the image data to identify precise location information;
associate, in a data store, the control point with at least a portion of the precise location information;
identify the landmark in an aerial image; and
determine that the landmark is identified as the control point.

13. The system of claim 12, wherein the landmark is identified in the aerial image using a machine learning algorithm trained to identify particular categories of landmarks.

14. The system of claim 13, wherein the particular categories of landmarks include at least a subset of manhole covers, lampposts, sidewalk corners, fire hydrants, roof edges, gutter edges, chimneys, telephone poles, driveways, air conditioning units, swamp coolers, and tops of light poles.

15. The system of claim 12, wherein to determine that the landmark is identified as the control point comprises instructions to:
determine that the landmark is identified as the control point by matching the precise location information to location information associated with a device at a time that the device captured the aerial image.

16. The system of claim 15, wherein the precise location information and the location information of the device are determined to match responsive to a determination that the precise location information and the location information are within a threshold distance.

17. The system of claim 12, wherein the processor is further configured to:
generate a three-dimensional model based on the aerial image and the precise location information.

18. A non-transitory computer readable medium storing instructions operable to cause one or more processors to perform operations to:
receive vehicle data including precise locations of a vehicle and corresponding location timestamps indicative of times that the vehicle was at the precise locations;
receive image data including multiple images of the vehicle, corresponding locations of a capture device when the capture device captured each of the multiple images, and corresponding capture timestamps that indicates a time that each of the multiple images was captured;
identify a landmark in one of multiple received images;
identify the landmark as a control point;
correlate the vehicle data with the image data to identify precise location information;
associate, in a data store, the control point with at least a portion of the precise location information;
receive aerial images from a first device;
identify the landmark in an aerial image of the aerial images; and
determine that the landmark is identified as the control point.

19. The non-transitory computer readable medium of claim 18, wherein to determine that the landmark is identified as the control point comprise to:
determine that the landmark is identified as the control point by matching the precise location information to location information associated with a device at a time that the device captured the aerial image.

20. The non-transitory computer readable medium of claim 19, wherein the precise location information and the location information of the first device are determined to match responsive to a determination that a timestamp associated with the precise location information in the data store is within a threshold time period of the time that the first device captured the aerial image.

* * * * *